United States Patent [19]

Nishigori et al.

[11] 3,920,922

[45] Nov. 18, 1975

[54] TERMINAL HUNTING SYSTEM IN AN AUTOMATIC TELEPHONE SWITCHBOARD

[75] Inventors: Shogo Nishigori, Kanagawa; Kenzi Mochizuki, Yokohama, both of Japan

[73] Assignee: Hitachi, Ltd., Japan

[22] Filed: Aug. 8, 1973

[21] Appl. No.: 386,550

[30] Foreign Application Priority Data

Aug. 11, 1972 Japan ................................ 47-79934

[52] U.S. Cl. ............................ 179/18 HA; 179/18 E

[51] Int. Cl. ............................................ H04q 3/10

[58] Field of Search ................................ 179/18 HA

[56] References Cited

UNITED STATES PATENTS 3,278,692 10/1966 Bean et al. ..................... 179/18 HA 3,745,260 7/1973 Anderson et al. .............. 179/18 HA

*Primary Examiner*—William C. Cooper

*Attorney, Agent, or Firm*—Craig & Antonelli

[57] ABSTRACT

A terminal hunting system for automatic telephone switching, in which, in the event that, of a plurality of subscribers' numbers combined into a group including a pilot number, the pilot number is dialed and found to be busy, one of the idle numbers in the group is seized in such a manner that if the common control device receives the busy pilot number from the register as a called number, it sends a signal to the register and resets itself, while the register changes the called number to another number in the group thereby to energize the common control device again. This process is repeated until an idle number is found. The above-mentioned arrangement eliminates the necessity of the number group and the terminal hunting unit required in the conventional system.

8 Claims, 6 Drawing Figures

TERMINAL HUNTING SYSTEM IN AN AUTOMATIC TELEPHONE SWITCHBOARD

The present invention relates to a terminal hunting system for automatic telephone switching.

The terminal hunting system is a system with which the caller's trouble of keeping in memory the numbers of nearby telephones available if the called number is busy and dialling them until any of them is found idle is eliminated by dialling a pilot number of a predetermined group of lines so that an idle one of them is automatically selected and connected.

The objects, features and advantages of the invention will be made apparent by the detailed description taken in conjunction with the accompanying drawings, in which.

Figure 3A:
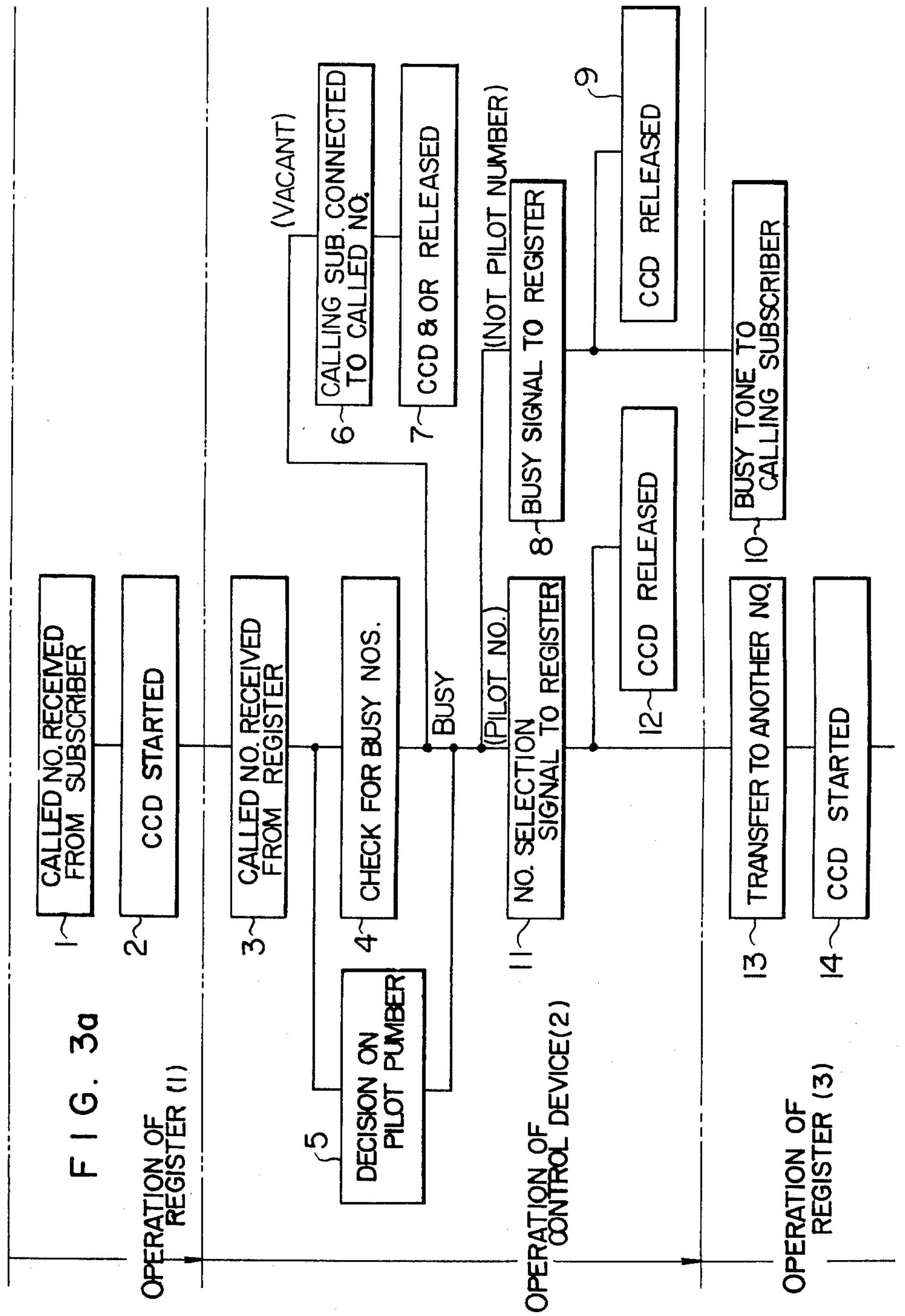
Figure 3B:
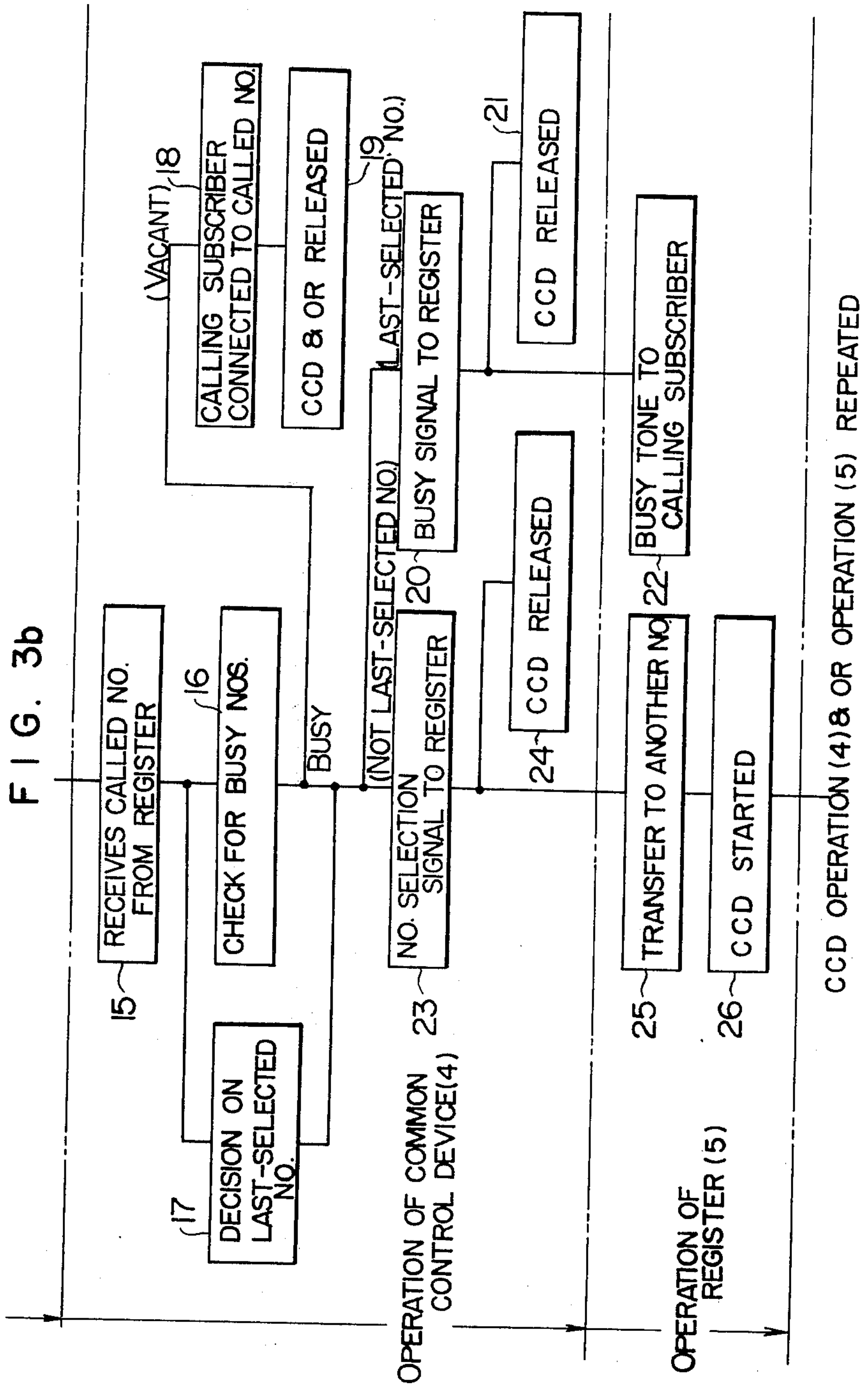
Figure 4A:
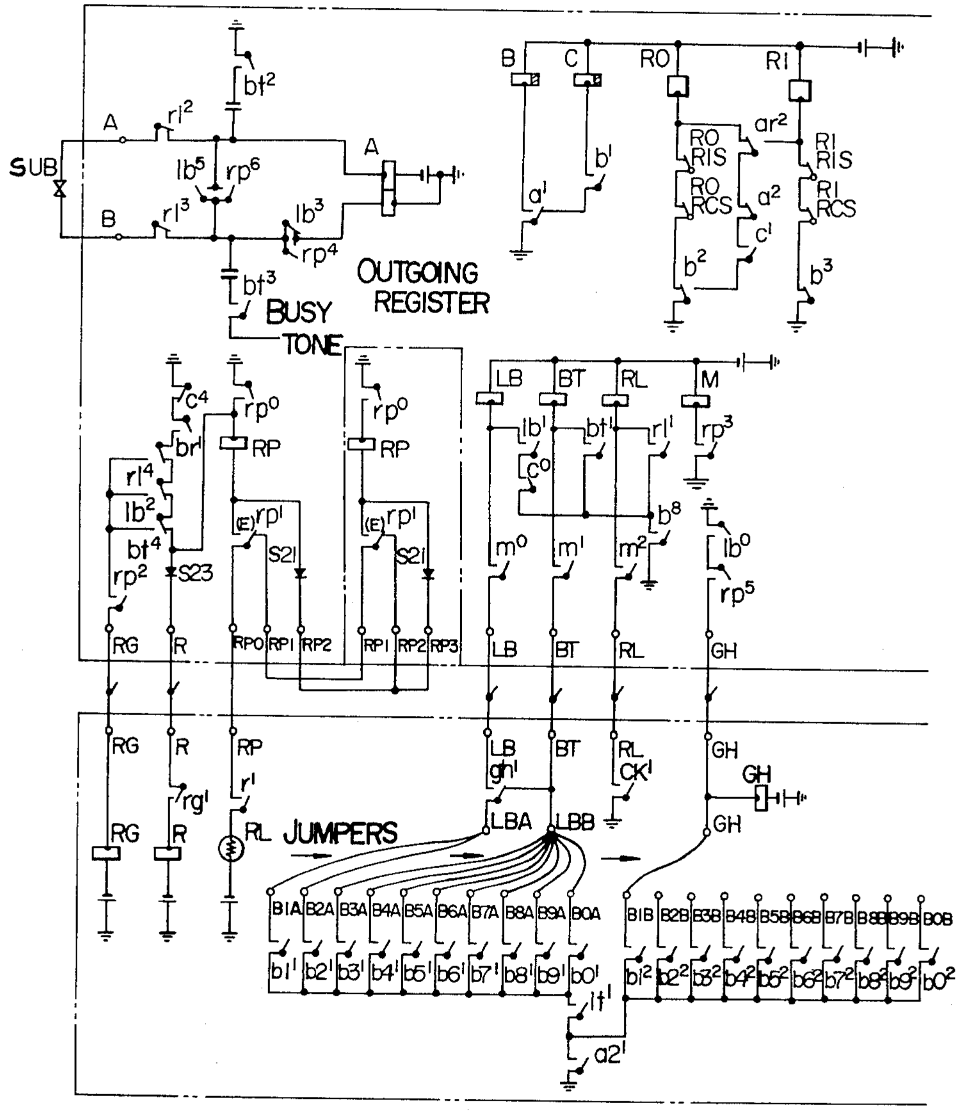
Figure 4B:
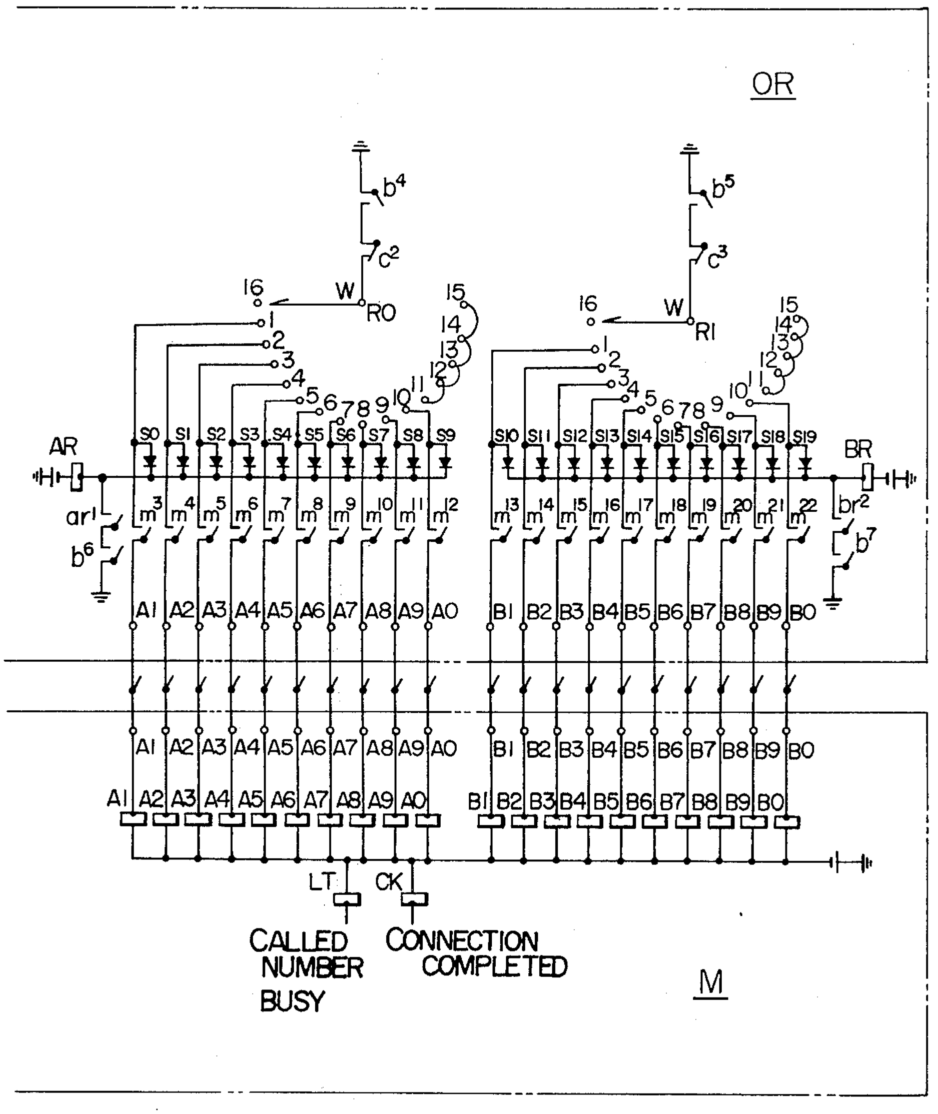

FIGS. 3*a* and 3*b* are respectively the first and the second parts of a flow chart showing the operation of the automatic telephone switchboard embodying the invention; and FIGS. 4*a* and 4*b* are respectively the first and the second parts of a circuit diagram showing an embodiment of the present invention.

Figure 1:
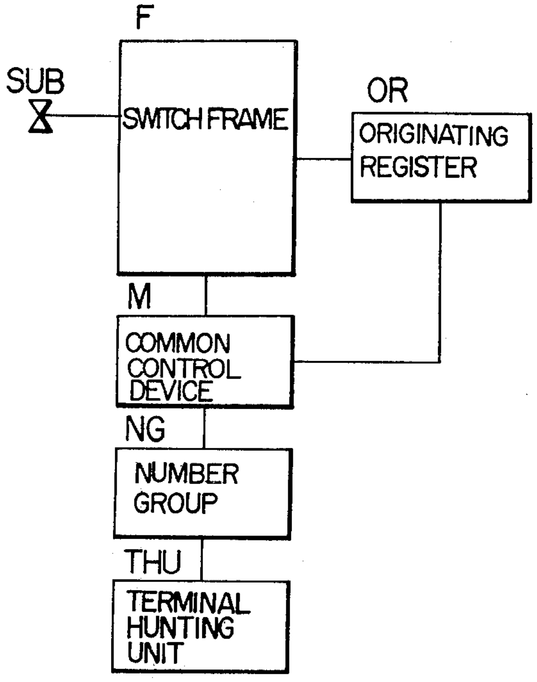
FIG. 1 PRIOR ART
FIG. 1 is a block diagram showing a circuit arrangement of the terminal hunting system for the conventional telephone switchboard.

In the conventional terminal hunting system, there are provided, in addition to the common control device M, a number group NG and a terminal hunting unit THU to perform the terminal hunting operation, as shown in FIG. 1. The operation of the well-known terminal hunting system will be explained below with reference to FIG. 1.

When a calling subscriber dials a number, the called number is received by the originating register OR thereby to actuate the common control device M. Upon receipt of the called number from the originating register OR, the number group NG is energized by the common control device M. The number group NG analyzes the called number and decides whether or not the called number is a pilot number of a group of telephone numbers. If it is a pilot number, the number group NG makes a decision on which group the pilot number belongs to and applies that information to the terminal hunting unit THU. The terminal hunting unit THU checks the numbers included in the group one by one and the information on the location of an idle line, if any, is sent to the common control device M, so that the common control device M completes the connection to the called party. This well-known system has the disadvantage of very high cost because of the requirement for provision of such special equipment as the number group NG and the terminal hunting unit THU to perform terminal hunting. The present invention provides an economical terminal hunting system which is capable of terminal hunting without the number group NG or the terminal hunting unit THU.

Figure 2:
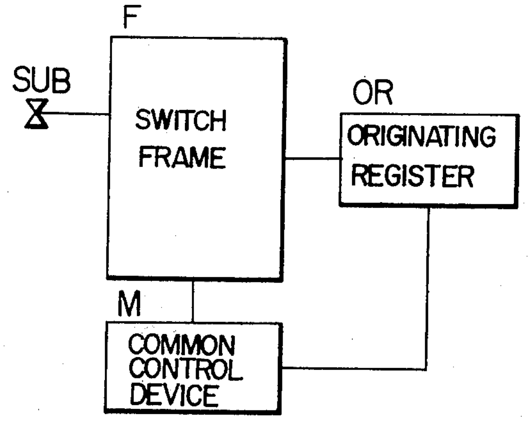
FIG. 2 is a block diagram showing a circuit arrangement of an automatic telephone switchboard embodying the present invention.

First, the operation of the invented system will be explained below with reference to FIG. 2 and FIGS. 3*a* and 3*b*.

When the calling subscriber dials a number (hereinafter referred to as "the called number A"), the originating register OR receives the called number A and the common control device M is actuated, by the originating register OR. The common control device M checks line busy for the called number A upon receipt of the called number A from the originating register OR, whereupon it decides whether or not the called number is a pilot number of the group.

If the called number A is idle, the common control device M connects the calling subscriber to the called number A and then the common control device M and the originating register OR disconnect themselves from the circuit. If the called number A which is not a pilot number is busy, on the other hand, the common control device M sends busy information to the originating register OR as in the case of connection to an independent subscriber and the common control device M is reset. Upon receipt of the busy information from the common control device M, the originating register OR sends a busy tone to the calling subscriber.

In the event that the called number A which is busy is a pilot number, the common control device M sends to the originating register OR terminal hunting information instead of the busy information and the common control device M is reset. The originating register OR, upon receipt of the terminal hunting information, changes the called number within the originating register OR, so that the common control device M is actuated for the second time. The called number to which transfer is made is hereinafter referred to as "the called number B".

The arrival of the called number B at the common control device M causes the common control device M to check the number to determine whether it is busy or not, while at the same time deciding on whether or not the called number is the last selected line in the group.

In the case where the called number B is idle, the calling subscriber is connected to the called number B by the common control device M, whereupon both the common control device M and the originating register OR disconnect themselves from the circuit. If, however, the called number B is busy and the last-selected line in the group, busy information is sent from the common control device M to the originating register OR, so that the common control device M disconnects itself from the circuit. The originating register OR sends a busy tone to the calling subscriber as in the case of an independent busy number.

Unless the called number B is the last-selected number within the group, terminal hunting information is sent again to the originating register OR from the common control device M and the common control device M is reset. Upon receipt of the terminal hunting information from the common control device M, the originating register OR changes the called number, so that the common control device M is actuated again. As will be apparent from the flow chart of FIGS. 3*a* and 3*b*, this process is repeated until an idle number is found or, in the absence of an idle number, until the last selected number is reached. In this way, it is possible to effect terminal hunting without providing the special equipment such as the number group NG or the terminal hunting unit THU.

As embodiment of the present invention will be explained in detail below with reference to FIGS. 4*a* and 4*b*.

In the drawing, reference symbol A shows a relay for the originating register OR provided for the purpose of receiving dial impulses from the calling subscriber, symbol B a relay having the function of slow release which operates during the operation of the originating register, symbol C a relay having the function of slow release which operates during the dialling, symbol $R_0$ a rotary switch for counting the pulses of the dialled digit of the first order, symbol $R_1$ a rotary switch for counting the dialled digit of the second order, symbol RP a relay which operates during the energized state of the common control device caused by the originating register, symbol LB a relay for terminal indication, symbol BT a relay for information on a busy called number, symbol M a register-marker connector relay, AR a relay which is energized on completion of receipt of the digit of the first order, symbol BR a relay which operates on completion of receipt of a digit of the second order, and symbol RL a relay for disconnecting the originating register.

Reference symbol R in the common control device shows a relay for starting the operation of the common control device, symbol RG a relay for ensuring the information transfer, symbol GH a relay for terminal hunting and identification, symbol LT a relay for detecting the busy state of the called number, symbol CK a relay which is energized when the connection to the called number is completed, symbols $A_1$ to $A_0$ relays which operate in response to the first-order digit of the called number, and symbols $B_1$ to $B_0$ relays which operate in response to the second-order digit thereof. In the drawing, the small letters show contacts of the respective switches and symbol (E) shows that the switch indicated thereby is actuated earlier than the ones without any such symbol.

When the calling number is connected to the originating register OR, the relay A is operated by the establishment of a calling subscriber telephone loop. The operation of relay A causes relay B to be operated by the current flow through the ground, contact $a'$, coils of relay B and the battery. When the calling subscriber begins to dial the called number, relay A repeats on-off operations in response to dial impulses. In the first "off" state of the relay A, the relay C is operated as current flows through the ground, contact $a'$, contact $b'$, coils of relay C and the battery. The relay C continues to be operated by its slow release characteristic during the occurrence of a series of impulses. The dial impulses generated by the on-off operation of the relay A are applied from the ground through contact $b^2$, contact $c'$, contact $a^2$, contact $ar^2$, rotary switch $R_0$ and the battery whereby the rotary switch $R_0$ counts the first-order digit of the called number.

In the event that the first-order digit of the called number is "2", for example, the wiper of the rotary switch $R_0$ stops at bank 2. Upon completion of the dialling of the first-order digit, the relay C is slowly turned off through the contact $a'$, so that the relay AR is operated as current flows through the ground, contact $b^4$, contact $c^2$, bank 2 of the wiper of the rotary switch $R_0$, diode $S_1$, coils of relay AR and the battery, with the result that the relay AR is self-maintained through the contact $ar^1$.

When the calling subscriber dials the second-order digit, the relay A repeats on-off operations and the relay C is operated through a similar circuit to the one in the preceding case, so that the rotary switch $R_1$ counts the second-order digit as current flows through the ground, contact $b^2$, contact $c^1$, contact $a^2$, contact $ar^2$, coils of rotary switch $R_1$ and the battery.

If the second-order digit dialled is "1", the wiper of the rotary switch $R_1$ stops at the position of bank 1. Upon completion of the dialling of the second-order digit, the relay C is slowly turned off through contact $a^1$.

The turning-off of the relay C causes the relay BR to be energized as current flows through the ground, contact $b^5$, contact $c^3$, the wiper positioned at bank 1 of the rotary switch $R_1$, diode $S_{11}$, coils of the relay BR and the battery, whereby the relay BR is self-maintained through the contact $br^2$.

With the operation of the relay BR, the common control device M is energized through the ground, contact $c^4$, contact $br^1$, contact $rl^4$, contact $lb^2$, contact $bt^4$, diode $S_{23}$, contact $rg^1$, coils of relay R and the battery, so that the relay R in the common control device is operated.

When the relay R is operated, the relay RP is also operated through the battery, resistance lamp RL, contact $r^1$, contact $rp^1$, contact $rp^1$ of the other originating register OR, diode $S_{21}$, coils of the relay RP, contact $bt^4$, contact $lb^2$, contact $rl^4$, contact $br^1$, contact $c^4$ and the ground. With the operation of the relay RP, relay M is operated as current flows through the ground, contact $rp^3$, coils of relay M and the battery. Upon the operation of relay M, relay $A^2$ in the common control device M is operated as current flows through the ground, contact $b^4$, contact $c^2$, bank 2 of the rotary switch $R_0$, contact $m^4$, coils of relay $A_2$ and the battery, while at the same time operating the relay $B_1$ in the common control device M as current flows through the ground, contact $b^5$, contact $c^3$, bank 1 of the rotary switch $R_1$, contact $m^{13}$, coils of relay $B_1$ and the battery, with the result that the common control device M receives the called number "21" from the originating register OR.

The common control device M decides whether or not 21 is a pilot number of the grouped lines. The jumpers shown in FIGS. 4a and 4b assume that 21 to "23" represent a group of telephone numbers with 21 as a pilot number, while "24" and "20" are independent numbers. In view of the fact that 21 is a pilot number of the group, relay GH is operated as current flows through the ground, contact $a2^1$, contact $b1^2$, coils of relay GH and the battery. When the calling subscriber dials "22", however, relay GH remains unenergized because it is not a pilot number even though the relays $A_2$ and $B_2$ are operated.

While making the decision on the pilot number of the grouped telephone lines, the common control device M checks the called subscriber to determine whether it is busy or not. If the called subscriber is idle, the calling subscriber is connected to the called subscriber thereby to operate the relay CK. When the called subscriber is busy, on the other hand, the relay LT is operated. Regardless of whether the called number is a pilot number or not, if the called subscriber is idle, the operation of relay CK causes the relay RL in the originating register OR to be operated as current flows through the ground, contact $ck^1$, contact $m^2$, coils of relay RL and the battery, so that the relay RL is self-maintained through the contact $rl^1$. With the operation of relay RL, the relay RG is also operated as current flows through the ground, contact $c^4$, contact $br^1$, contact $rl^4$, contact $rp^2$, coils of relay RG and the battery. The operation of relay RG causes relay R to be disassociated from the circuit by contact $rg^1$, thereby de-energizing the relay RP in the originating register OR through the contact $r^1$. Upon the de-energization of the relay RP, relay M in the originating resister OR, relay RG and relay A are de-energized through the contacts $rp^3$, contact $rp^2$ and contact $rp^6$ respectively. The de-energization of relay RG causes the common control device M to be released, whereupon the relay B is slowly released through the contact $a^1$. With the de-energization of the relay B, relay RL is also de-energized through contact $b^8$, while the rotary switches $R_0$ and $R_1$ are automatically returned to original positions by the operation of the well-known interrupter contact RIS and cam contact RCS through the contacts $b^2$ and $b^3$, so that the originating register OR is de-energized.

In the event that a number, say, 22 other than the pilot number is busy, the operation of relay LT causes the relay BT in the originating register OR to be operated as current flows through the ground, contact $a2^1$, contact $lt^1$, contact $b2^1$, contact $gh^1$, contact $m^1$, coils of the relay BT and the battery, so that the relay BT is self-maintained by contact $bt^1$. With the operation of relay BT, relay RG is operated as current flows through the ground, contact $c^4$, contact $br^1$, contact $bt^4$, contact $rp^2$, coils of the relay RG and the battery. As a result, the common control device M disconnects itself from the circuit in a similar manner as in the preceding case. With the operation of relay BT, a busy tone is sent to the calling subscriber from the originating register OR through the contacts $bt^2$ and $bt^3$.

The operation of the system according to the present invention in the event of the pilot number 21 of the grouped lines being busy will be explained below.

The relay GH is in operation when a pilot number is involved, and therefore the relay LT is operated, which in turn operates the relay LB in the originating register OR as current flows through the ground, contact $a2'$, contact $lt'$, contact $b1^1$, contact $gh^1$, contact $m^0$, coils of the relay LB and the battery, so that the relay LB is self-maintained by the contact $lb^1$. The operation of relay LB causes the relay RG to be operated as current flows through the ground, contact $c^4$, contact $br^1$, contact $lb^2$, contact $rp^2$, coils of relay RG and the battery, so that the common control device M is released in a similar manner as in the preceding case. Upon operation of the relay LB, the embodiment of FIGS. 4*a* and 4*b* so operates that 1 is added to the second-order digit of the called number to transfer to a new number in the group. In other words, the release of the relay RP due to the operation of the relay LB causes the relay A to be released by contact $lb^3$, whereupon the relay C is operated as current flows through the ground, contact $a^1$, contact $b^1$, coils of relay C and the battery. The operation of relay C causes the rotary switch $R_1$ to be operated as current flows through the ground, contact $b^2$, contact $c^1$, contact $c^1$, contact $a^2$, contact $ar^2$, coils of rotary switch $R_1$ and the battery, whereby the bank of the wiper is advanced by one step thereby to add 1 to the second-order digit of the pilot number on one hand and release the relay LB by contact $c^0$ on the other. The release of the relay LB causes the relay A to be energized by contact $lb^3$, whereupon relay C is slowly released by contact $a^1$. With the release of relay C, the relay R in the common control device M is operated as current flows through the ground, contact $c^4$, contact $br^1$, contact $rl^4$, contact $lb^2$, contact $bt^4$, contact $rg^1$, coils of relay R and the battery, so that the common control device M is actuated.

With the energization of common control device M, the relays RP and M are operated as in the preceding case. The operation of relay M causes the relay $A_2$ in the common control device M to be operated by a circuit similar to the one mentioned with reference to the preceding case. Also, the bank of the wiper of the rotary switch $R_1$ is advanced by one step to be positioned as 2 under this condition, and therefore the relay $B_2$ in the common control device M is operated as current flows through the ground, contact $b^5$, contact $c^3$, bank 2 of rotary switch $R_1$, contact $m^{14}$, coils of relay $B_2$ and the battery, so that the common control device M receives 22 which is the result of adding 1 to the second-order digit of the pilot number included in the group. Upon operation of relay RP, the relay GH in the common control device M is operated as current flows through the ground, contact $lb^0$, contact $rp^5$, coils of relay GH and the battery. The common control device M checks the new number to determine whether it is busy or not, while at the same time ascertaining whether or not it is the last-selected number in the group.

If the new called number is not busy, the calling subscriber is connected to the called subscriber, whereupon the relay CK is operated, so that the common control device M and the originating register OR disconnect themselves from the circuit as in the preceding case. When the new called number is busy, the fact that 22 is not the last-selected number in the group causes the relay LB in the originating register OR to be operated by the operation of relay LT as current flows through the ground, contact $a2^1$, contact $lt^1$, contact $b2^1$, contact $gh^1$, contact $m^0$, coils of relay LB and the battery. With the operation of the relay LB, the common control device M, as in the preceding case, disconnects itself from the circuit, while the originating register OR produces an additional 1 pulse and adds it to the second-order digit of the called number 22, so that the resulting number 23 is applied to the common control device M to actuate it again.

Upon the actuation of the common control device M, the relays RP and M in the originating register OR and the relay R are operation again in a manner similar to the one in the preceding case. The operation of relay M causes the relays $A_2$ and $B_3$ to be operated, with the result that the common control device M receives the number 23 which is the result of adding 1 to the second-order digit of 22. As a result of operation of the relay RP, relay GH is operated as current flows through the ground, contact $lb^0$, contact $rp^5$, coils of relay GH and the battery. The common control device M checks the new called number to determine whether or not it is busy, while at the same time making a decision as to whether or not it is the last-selected line in the group. In the event that the new called number is not busy, the calling subscriber is connected to the called subscriber, so that the relay CK is operated thereby to release the common control device M and the originating register OR in a manner similar to the one in the preceding case.

In view of the fact that the number 23 is the last-selected number in the group, the relay LT is operated if the called number is busy, whereupon the relay BT in the originating register OR is actuated as current flows through the ground, contact $a2^1$, contact $lt^1$, contact $b3^1$, contact $m^1$, coils of the relay BT and the battery, so that relay BT is self-maintained by contact $bt^1$. With the operation of relay BT, the common control device M is released in a manner similar to the case where an independent line is busy, whereupon the originating register OR transmits a busy tone to the calling subscriber through contacts $bt^2$ and $bt^3$.

As will be noted from the above description, it is apparent that according to the present invention terminal hunting is economically performed by addition or ordinary relays to the originating register OR and the common control device M, and for the embodiment of FIGS. 4*a*and 4*b* by addition of relay LB to originating register OR and relay GH to the common control device M without providing such special equipments as a number group and a terminal hunting unit.

Since a hunting group usually consists of a series of successive numbers, the present invention is effectively applied to the method as shown in FIG. 4 in which a 1 pulse is generated in the originating register OR and added to the second-order digit of the called number thereby to repeatedly actuate the common control device. This is, however, only an embodiment of the invention and all the methods in which a new number is generated in the register are included in the scope of the present invention. Further, the pilot number and the last-selected number may be determined at will by changing the jumper positions of the common control device M. Even though the above explanation was made with reference to an embodiment involving an originating register for two-digit telephone number, the present invention is equally effectively applied to a system including an incoming register or position register. In addition, the transfer to another number in the register for terminal hunting is possible even when a called number consists of three or four instead of two digits.

What we claim is:

1. A terminal hunting system comprising means provided within a common control device for receiving a called number from a register and determining whether or not said called number is a pilot number of a hunting group, said means applying a group indication signal to said register in the event that said called number is a pilot number and busy, said common control device being reset upon receipt of said group indication signal, and means provided within said register for transferring from said called number to another number in said hunting group and actuating said common control device again in the event that said called number is a pilot number, said transfer and actuation of said common control device being repeated until an idle line is found in the group thereby to complete the connection to a called subscriber.

2. A terminal hunting system according to claim 1, in which said common control device further comprises means for ascertaining whether or not a busy called number is a last-selected busy number in said hunting group, said common control device operating in the same manner as for an ordinary independent telephone line when all of the lines in said group are busy.

3. A terminal hunting system according to claim 1, in which said means for transferring to another telephone number generates a pulse, said pulse being used to add 1 to the number stored in a number counting and storage means provided in said register.

4. In a telephone system including:

an originating register for receiving the number of a called subscriber; and a common control, for controlling the operation of said system;

an improved terminal hunting system comprising first means, located within said common control, for receiving said called number from said originating register and determining whether or not said called number is a pilot number of a hunting group;

second means, located within said common control, and responsive to the busy condition of said pilot number, for supplying a busy indication signal;

third means, coupled to said first and second means, and located within said originating register, for releasing said common control in response to said pilot number being busy and for changing the number in said originating register to another number within said hunting group;

fourth means, located within said originating register and coupled to said third means, for actuating said common control, so as to cause said common control to test the condition of said another number; and fifth means, located within said originating register, for releasing said common control and for causing said originating register to transmit a busy indication to the calling subscriber in the event that said another number is the last selected number in said hunting group and is busy, and for causing said third means and said fourth means to respectively change the number in said originating register and to cause said common control to again be actuated and test the condition of the changed number, repeatedly, until an idle number in said hunting group is found or until said last-selected number is reached.

5. An improved terminal hunting system according to claim 4, wherein said third means includes means, responsive to the busy condition of a called number in said hunting group, other than a pilot number, for releasing said common control and for causing said originating register to transmit a busy indication to the calling subscriber.

6. An improved terminal hunting system according to claim 5, wherein said third means further includes means for changing the number in said originating register by respectively supplying pulses to a number counting and storage means for updating the number within said hunting group stored in said originating register.

7. An improved terminal hunting system according to claim 5, further including sixth means, located within said common control, and responsive to the idle condition of said called number and said another number within said hunting group changed by said third means, for releasing said common control and clearing the number of said called subscriber from said originating register thereby resetting said originating register.

8. An improved terminal hunting system according to claim 6, further including sixth means, located within said common control, and responsive to the idle condition of said called number and said another number within said hunting group changed by said third means, for releasing said common control and clearing the number of said called subscriber from said originating register thereby resetting said originating register.

* * * * *